United States Patent
Zhou et al.

(10) Patent No.: US 9,644,678 B2
(45) Date of Patent: May 9, 2017

(54) LOW-FRICTION SEAL

(75) Inventors: Bo Xiao Zhou, Houten (NL); Stellario Barbera, Hilversum (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/582,088

(22) PCT Filed: Mar. 11, 2011

(86) PCT No.: PCT/EP2011/001201
§ 371 (c)(1),
(2), (4) Date: Nov. 9, 2012

(87) PCT Pub. No.: WO2011/110360
PCT Pub. Date: Sep. 15, 2011

(65) Prior Publication Data
US 2013/0187342 A1    Jul. 25, 2013

Related U.S. Application Data

(60) Provisional application No. 61/313,413, filed on Mar. 12, 2010.

(51) Int. Cl.
| | | |
|---|---|---|
| *F16J 15/32* | (2016.01) | |
| *F16C 33/72* | (2006.01) | |
| *F16J 15/324* | (2016.01) | |
| *F16C 33/78* | (2006.01) | |

(52) U.S. Cl.
CPC .......... *F16C 33/72* (2013.01); *F16C 33/7826* (2013.01); *F16C 33/7876* (2013.01); *F16J 15/324* (2013.01); *F16C 2240/44* (2013.01)

(58) Field of Classification Search
CPC .. F16C 33/72; F16C 33/7826; F16C 33/7876; F16C 2240/44; F16J 15/324
USPC .......................................................... 277/559
See application file for complete search history.

(56) References Cited

U.S. PATENT DOCUMENTS

| | | | | |
|---|---|---|---|---|
| 2,932,535 | A * | 4/1960 | Peickii et al. ................. | 277/560 |
| 3,515,395 | A * | 6/1970 | Weinand .............. | F16J 15/3244 |
| | | | | 277/559 |
| 3,909,087 | A * | 9/1975 | Cairns ........................... | 384/293 |
| 4,420,163 | A * | 12/1983 | Takenaka et al. ............ | 277/400 |
| 4,573,690 | A * | 3/1986 | DeHart ................. | F16J 15/324 |
| | | | | 277/309 |
| 5,044,642 | A * | 9/1991 | Vogt ....................... | F16J 15/324 |
| | | | | 277/559 |
| 5,462,362 | A * | 10/1995 | Yuhta ........................ | A61F 2/32 |
| | | | | 384/13 |

(Continued)

FOREIGN PATENT DOCUMENTS

| | | |
|---|---|---|
| CN | 1492021 A | 4/2004 |
| CN | 101469771 A | 7/2009 |

(Continued)

*Primary Examiner* — Kristina Fulton
*Assistant Examiner* — Christine M Mills
(74) *Attorney, Agent, or Firm* — Bryan Peckjian; SKF USA Inc. Patent Dept.

(57) ABSTRACT

An elastomeric seal, the seal (10) having an elastomeric part (15) with a contact surface (17) for contacting, in use, a movable surface (30), the contact surface having a distribution of dimples thereon, the dimples having a depth of at least 9 μm, an aspect ratio of at least 0.2 and an area density of from 0.05 to 0.5.

11 Claims, 5 Drawing Sheets

D = diameter of dimple
a = distance between centers

(56) References Cited

U.S. PATENT DOCUMENTS

| | | | | |
|---|---|---|---|---|
| 5,511,886 | A * | 4/1996 | Sink | B61F 15/22 277/559 |
| 5,834,094 | A * | 11/1998 | Etsion et al. | 428/156 |
| 6,105,968 | A * | 8/2000 | Yeh et al. | 277/399 |
| 6,341,782 | B1 * | 1/2002 | Etsion | 277/399 |
| 6,619,664 | B1 * | 9/2003 | Metz | 277/399 |
| 6,902,168 | B2 * | 6/2005 | Tejima | F16J 15/3424 277/399 |
| 6,938,879 | B2 * | 9/2005 | Bancroft | F16J 15/164 251/306 |
| 7,052,016 | B2 * | 5/2006 | Tejima | F16J 15/3436 277/399 |
| 7,073,611 | B2 * | 7/2006 | Sui et al. | 175/57 |
| 7,156,399 | B2 * | 1/2007 | Lou | F16J 15/324 277/436 |
| 7,241,049 | B2 * | 7/2007 | Lin | E21B 10/24 384/95 |
| 7,399,122 | B2 * | 7/2008 | Fujita et al. | 384/276 |
| 7,500,676 | B2 * | 3/2009 | Tejima | F16J 15/3424 277/399 |
| 2007/0227299 | A1 * | 10/2007 | Marchiando et al. | 75/244 |
| 2010/0084820 | A1 * | 4/2010 | Maeda | F16J 15/3208 277/500 |
| 2011/0233872 | A1 * | 9/2011 | Iguchi | F16J 15/3412 277/400 |
| 2012/0274029 | A1 * | 11/2012 | Khonsari | F16J 15/3404 277/405 |

FOREIGN PATENT DOCUMENTS

| | | | |
|---|---|---|---|
| DE | 19821146 A1 | 11/1999 | |
| DE | 102009012366 A1 * | 9/2010 | ........... F16J 15/3236 |
| EP | 1378691 A2 | 1/2004 | |
| EP | 1793146 A1 | 6/2007 | |
| JP | WO 2008072738 A1 * | 6/2008 | ........... F16J 15/3208 |

* cited by examiner

D = diameter of dimple
a = distance between centers

Figure 3  Magnified view of contact surface w/ dimples
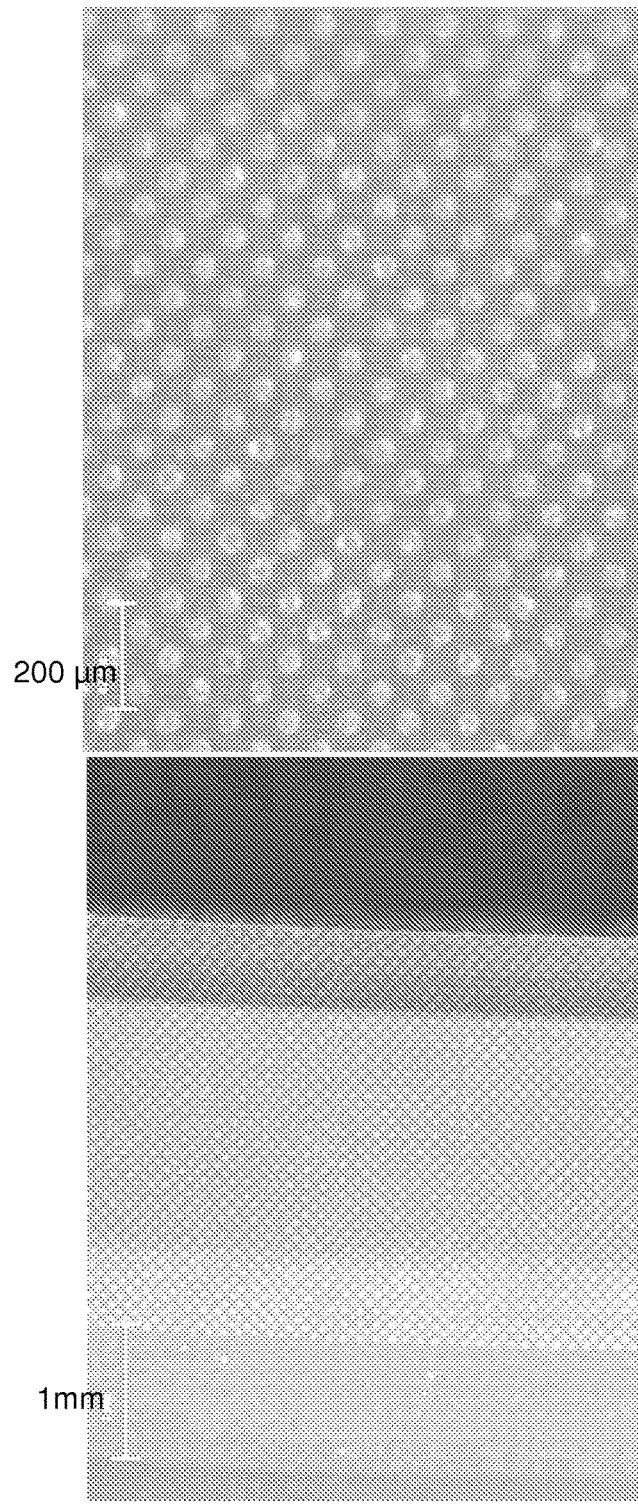

Change in coefficient of friction (%)

Change in coefficient of friction (%)

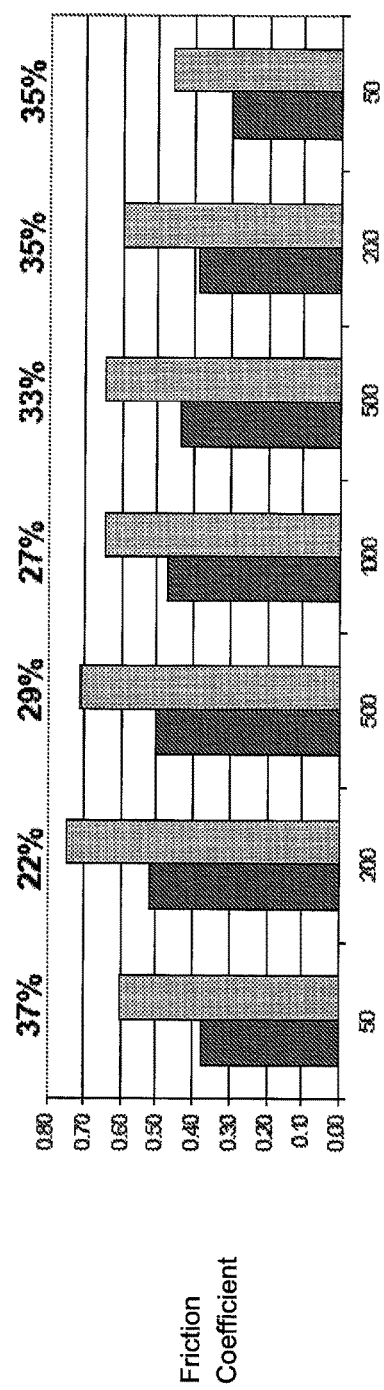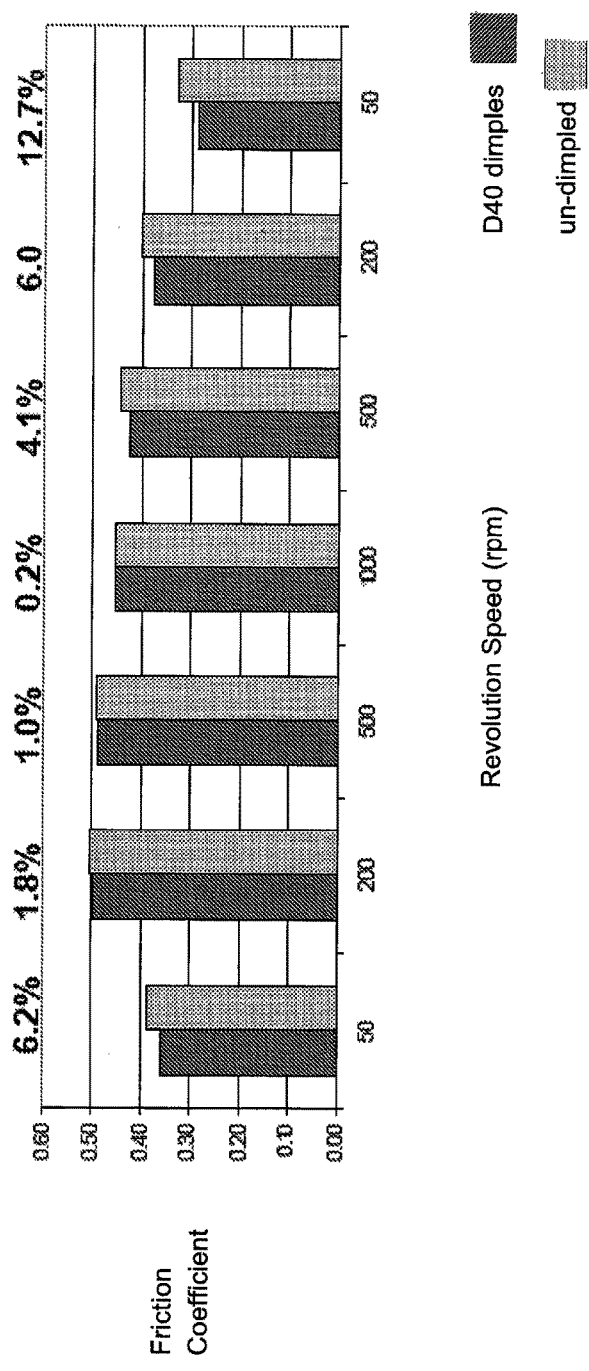

LOW-FRICTION SEAL

CROSS-REFERENCE

This application is the US national stage of International Application No. PCT/EP2011/001201 filed on Mar. 11, 2011, which claims priority to US Provisional Application 61/313,413 filed Mar. 12, 2010.

TECHNICAL FIELD

The present invention relates to the field of seals and bearings. More specifically, the present invention relates to a low friction seal and a method for manufacturing the seal.

BACKGROUND

Seals are used to prevent leakage between two environments. Seals can be used, for example, to retain a fluid, separate fluids or to prevent the transmission of particulate contaminants from one environment to another. A static seal would completely prevent leakage if the contacting surfaces were perfectly smooth or if the asperities in contact are heavily deformed and sufficiently flattened.

Seals can also be used in non-static devices such as rolling element bearings, or to seal the gap between a shaft and the bore of bearing housing. An example of a typical elastomeric lip seal is shown in FIG. 1. Non-static devices rely on seals to retain lubricant and prevent the ingress of water and particulate contaminants, such as grit. They also rely on an extremely thin elasto-hydrodynamic film between the seal and the moving surface to prevent excessive wear of the seal, particularly on start-up when slow movement leads to large frictional forces and the seal is most prone to wear.

It is known that seals account for the major part of friction in a sealed bearing. For instance, lip seals can account for approximately 75% of the total bearing power loss in a bearing run under typical application conditions at a load of 1015 N (C/P=20), speed of 3000 rpm and grease lubrication. As there are hundreds of billions of rubber seals used worldwide, which are running 24 hours per day and 365 days every year, the total energy consumption of the rubber seals is enormous. Reduction of friction torque induced by the rubber seals would thus lead to significant energy savings.

Accordingly, there is a desire for a seal that will overcome, or at least mitigate, some or all of the problems associated with the seals of the prior art, or at least provide a useful or optimized alternative.

SUMMARY

In a first aspect, the present invention provides an elastomeric seal, particularly for use in a bearing, the seal having a contact surface for contacting, in use, a movable surface, the contact surface having a distribution of dimples thereon, the dimples having a depth of at least 9 µm, an aspect ratio of at least 0.2 and an area density of from 0.05 to 0.5.

According to a second aspect, the present invention provides a method of forming the seal as described herein, the method comprising forming a seal using a mould having on a surface thereof an array of protrusions for forming the array of dimples.

According to a third aspect, the present invention provides a method of forming the seal as described herein, the method comprising forming a seal and using laser engraving to form the array of dimples.

According to a fourth aspect, the present invention provides a bearing comprising the seal as described herein.

According to a fifth aspect, the present invention provides the use of a seal as described herein to reduce the coefficient of friction in a bearing.

BRIEF DESCRIPTION OF THE DRAWINGS

The present invention will now be described further with reference to the accompanying drawings, provided by way of example, in which:

FIG. 3 shows a dimple texture on the contact surface of an elastomeric seal. The scale bar on the upper, more magnified, photo shows 200 µm. The scale bar on the lower, less magnified photo shows 1 mm.

FIG. 4a shows the reduction arising from the dimples with grease lubrication at 1000 rpm. FIG. 4b shows the reduction arising from the dimples with grease lubrication at 50 rpm.

FIGS. 5a and 5b show a bar chart of the friction coefficient [µ] in a seal at different revolution speeds (rpm). FIG. 5a shows the effect with a grease lubricant (LGMT2). FIG. 5b shows the effect with an oil lubricant (LGMT2 base oil). The left-hand, darker bar at each speed shows a seal with 40 µm (D40) diameter dimples. The right-hand, lighter bar at each speed shows an un-dimpled seal (base-line). The value above each pair of bars shows the reduction in the friction coefficient achieved by the addition of the dimples.

DETAILED DESCRIPTION

The present invention will now be described further. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Figure 1:
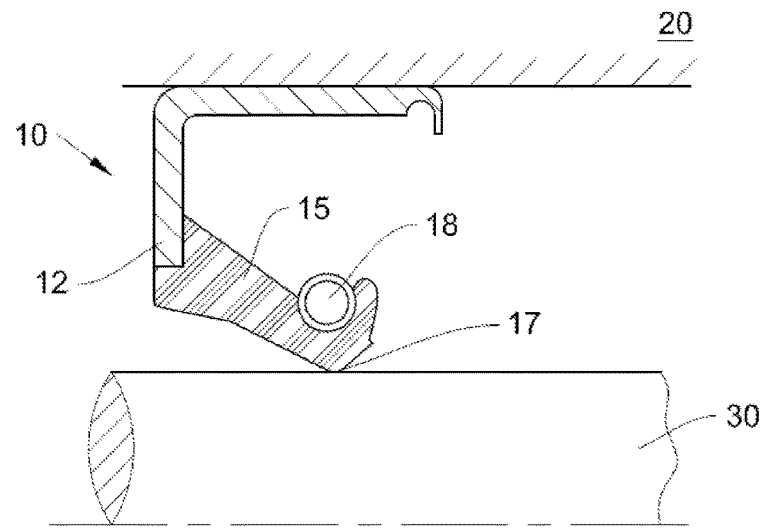
FIG. 1 shows a partial cross-section of a radial lip seal.

In the first aspect, the present invention provides an elastomeric seal for dynamic applications, such as a radial lip seal. The seal may be mounted between the inner and outer rings of a rolling element bearing. Alternatively, as shown in the example of FIG. 1, the seal 10 may enclose the gap between a housing 20 and a shaft 30. Typically, the seal comprises a metal casing 12 to which an elastomeric sealing lip 15 is bonded. The sealing lip has a contact surface 17, which bears against a counterface on the shaft 30. To ensure that the lip 15 remains in contact with the shaft 30, the seal in this example is provided with a garter spring 18. The lip 18 remains in contact with the shaft 30 due to the a radial force provided by the garter spring 18. During use of the seal, the seal lip 15 is in sliding contact with the shaft. To reduce friction, the sliding contact is lubricated with oil, or base oil from a grease. In a seal according to the invention, friction is further reduced in that the contact surface 17 on the seal lip 15 is provided with a distribution of dimples. The dimples have a depth of at least 9 μm, an aspect ratio of at least 0.2 and an area density of from 0.05 to 0.5.

Friction torque in a dynamically sealed device is mainly generated on the tribological sliding contact between the rubber seal lip and the counterface (usually a steel shaft or the land of a bearing ring). The present inventors have discovered that a dimple surface-texturing as described herein provides a significant reduction in sealing friction under both oil and grease lubrication; especially grease lubrication. Furthermore, they have optimised the dimple size of textured seals to provide a beneficial low-friction seal.

"Dimples" as discussed herein refer to small dents or impressions in the surface of the seal. Relative to the size of the seal, the dimples are small, shallow indentations in the surface. The dimples may have any shape or profile on the seal surface and extending into the seal. In one embodiment, the shaping and arrangement of the dimples may resemble the surface texturing of a golf-ball, the seal provided with a distribution of concavities thereon.

Dimples are distinct from pillar or bump surface textures. The inventors have discovered that the dimple structure surprisingly has an improved effect on the sealing friction compared to such pillar type structures. Pillars change pumping properties of the seal, i.e. reduce the "reverse" pumping effects. However, the present inventors have discovered that the use of the dimples described herein has no effect on the pumping effects.

Furthermore, the dimples are distinct from mere surface roughness. The dimples are deeper and specifically arranged on the surface to provide the beneficial effects. In addition, the dimples are distinct from ruts or grooves or surface scoring. The shaping, dimension and arrangement of the dimples is key to providing a reduced friction seal.

The dimples have a depth of at least 9 μm. The depth of a dimple is measured from the lowest point in the dimple to the level surface of the seal. The measurement is conducted along a line orthogonal to the surface of the seal. Techniques are well known to observe and measure parameters of surfaces. Accordingly the parameters of depth, size and distribution of the dimples on a surface can be determined with these techniques.

Preferably the dimples have a depth of from 9 to 15 μm. Preferably the dimples have a depth of from 10 to 12 μm. Dimples deeper than 15 μm were surprisingly found to reduce the positive effect on the sealing friction. It is further speculated that the deeper dimpled surfaces could be more prone to wear. It has been found that process limitations make it harder to produce smaller dimples without undue cost and that the beneficial effects are reduced as the dimples become smaller and approach the values for surface roughness.

The dimples preferably all have substantially the same dimensions, but at least the mean values of the parameters for the dimples should preferably satisfy the parameters described herein. That is, preferably the mean depth of the dimples is at least 9 μm, the mean aspect ratio is at least 0.2 and the mean area density is from 0.05 to 0.5. The standard deviation from the mean value of each parameter is preferably low, for example, the standard deviation for the mean depth is preferably less than 0.25 μm, for the mean aspect ratio is preferably less than 0.025 and for the mean area density less than 0.0025.

Figure 2:
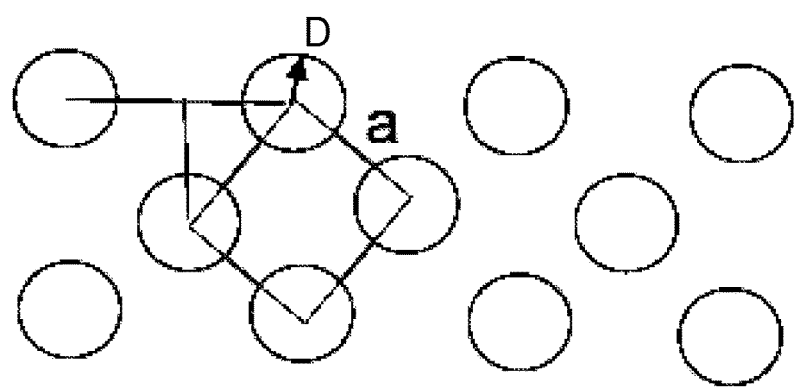
FIG. 2 shows a schematic explanation for how to determine the area density of the dimples when the dimples are circular and formed in a regular array. "D" is the diameter of the dimple and "a" is the distance between centres of dimples forming a repeating unit of the array.

The dimples have an area density of from 0.1 to 0.3, preferably from 0.15 to 0.25. Preferably the area density is from 0.18 to 0.22 and most preferably about 0.20. The area density is a measure of the extent to which the dimples cover the contact surface 17 of the seal. The area density is calculated by determining the ratio of dimple to total area in the smallest repeating unit of the surface. For example, in a regular square grid array, as shown in FIG. 2, the area density—or dimple fraction f—may be calculated as follows: $\pi r^2/a^2$. Using diameters, the dimple fraction may be calculated as $f=\pi D^2/4a^2$.

The dimples have an aspect ratio of at least 0.2. The aspect ratio is the ratio of the dimple depth to dimple diameter. For non-circular dimples, the aspect ratio can be determined by using the mean diameter in the foregoing formula. Preferably the aspect ratio is from 0.2 to 0.75, more preferably from 0.25 to 0.5. These aspect ratios have been found to provide a beneficial reduction in the sealing friction without undue wear.

Preferably each dimple presents a substantially circular cross-section at the contact surface. The surface cross-section may, alternatively, be elongate in one direction to provide an oval cross-section. Especially when the dimples are circles at the contact surface, the dimples preferably have a diameter at the contact surface of from 20 to 40 μm (D20 to D40). Usually the lip contact width of rubber seals is smaller (less than 1 mm). The present inventors have discovered that smaller dimples are preferable. Without wishing to be bound by theory, it is speculated that this allows for the maximum numbers of dimples on the lip contact surface. In this case, D20 and D40 are selected for dimpled seals.

Preferably the dimples are cylindrical, conical or frustoconical. That is, the volume of the dimple is preferably cylindrical, conical or frustoconical in shape. The most preferred dimple has a substantially circular cross-section that extends into the seal. The cross-section may taper, either to a point or to a substantially circular base. Preferably the dimple is cylindrical or has a slight taper. These shapes are the simplest to form with a mould and hence the cost of preparing the surface texturing of the seal is reduced.

Preferably the distribution of dimples forms a regular array. For example, the dimples may be arranged in a regular grid, or in a hexagonal packing configuration. Other configurations or distributions may be selected as necessary.

Preferably the array of dimples covers substantially the entire contact surface. This increases the beneficial effects that are seen. Furthermore, for ease of manufacture, the dimples may extend on the seal beyond the contact surface.

The elastomeric seal, in particular the seal lip, is preferably formed of a deformable elastomer. The seal may be reinforced by a spring or tensioned/resilient component. Preferred elastomers for seals include acrylate rubber, fluoro rubber, nitrile rubber, hydrogenated nitrile rubber, or mixtures of two or more thereof.

The seal is preferably a lip seal. Lip seals and configurations of such seals are well known in the art. The seal has a contact surface for contacting, in use, a movable surface and this forms part of the seal lip. The movable surface (counterface) is the surface against which the seal operates and is not particularly limited. For example, the counter-surface may be a rotatable shaft or a surface of the rotatable bearing ring in a rolling element bearing. Depending on the application and strength requirements, the counterface may comprise any suitable material. For example, a plastic, a synthetic or a metal substrate may be used.

Preferably the contact surface of the seal lip provided with a wear resistant coating. Such coatings are well known for lip seals. Preferably the coating is provided after the surface texturing to ensure that the coating lines the dimples. It is preferred that the coating thickness is accounted for when the dimples are prepared to ensure that the final surface dimples, including the wear resistant coating are proportioned as described herein.

In the second aspect, the present invention provides a method of forming the seal as described herein, the method comprising forming a seal using a mould having on a surface thereof an array of protrusions for forming the array of dimples on the contact surface of the seal lip.

In the third aspect, the present invention provides a method of forming the seal as described herein, the method comprising forming a seal and using laser engraving to form the array of dimples.

In the fourth aspect, the present invention provides a bearing comprising the seal as described herein.

Preferably the bearing further comprises a grease lubricant. The present inventors have discovered that the surface dimpling described herein is particularly effective at reducing the coefficient of friction when a grease lubricant is employed with the seal.

In the fifth aspect, the present invention provides the use of a seal as described herein to reduce the coefficient of friction in a bearing.

EXAMPLES

The effect of the present invention is demonstrated by the following non-limiting examples.

Dimple textures were prepared on seal lips and the textured seals were tested. The dimples were prepared by laser technology to have dimples of diameter 20 µm (D20), 40 µm (D40) and 60 µm (D60). The D20 and D40 dimples had a depth of 9 microns. The D60 dimples had a depth of 10 microns. All of the dimples had an area density of 0.20 (20%). The dimple texture D40 (40 µm in diameter) provided the highest reduction in friction coefficient. Two samples were prepared and tested for each dimple size.

The surface texture was made by a Nd:YVO4 laser, which has a wavelength of 355 nm and is operated in picoseconds pulse range ($10 \times 10^{-12}$ s). Since the laser is operated in the Ultra-violet light range (10 to 400 nm) and with a very short pulse, it provides a well defined structure without the present of melting debris (clean textured surface).

The textured seals were then tested on a seal test rig (ERC Pearl II rig), lubricated with LGMT2 grease and with the base oil of LGMT2 grease, at speeds of 50 rpm, 200 rpm, 500 rpm and 1000 rpm, on a standard steel shaft Ra 0.45 µm, where the shaft diameter is 82 mm. The linear sliding speed of the seal lip on the shaft surface is 0.215 m/s, 0.859, 2.147 and 4.294 m/s, respectively. Friction torque was measured during the test and the coefficient of friction was calculated based on the radial force of the seals on the shaft measured before the test.

The effect of shaft speeds on sealing friction was observed: the sealing friction increases with increasing of shaft speed from 50 rpm to 200 rpm and/or 500 rpm, then decreases at 1000 rpm. With few exceptions, there is a trend that with increasing of the shaft speed, the effect of dimples on the reduction of sealing friction decreases slightly for both oil and grease lubrication conditions. Without wishing to be bound by theory, with increasing the shaft speeds, the hydrodynamic lubrication effect and the lubrication film thickness increases. As a consequence, the contributions of surface texture to the film build-up and to the reduction in sealing friction decrease.

Figure 6:
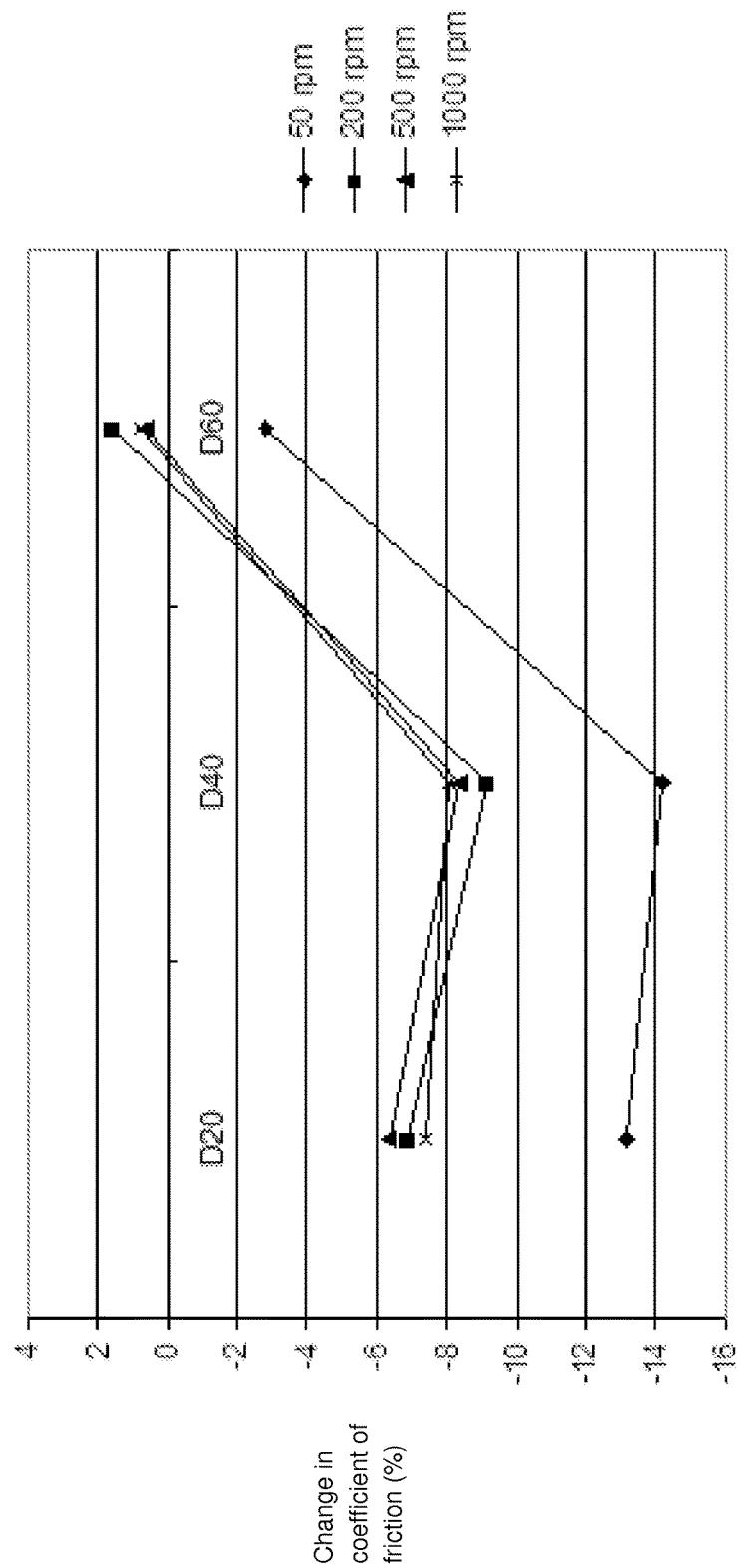
FIG. 6 shows the reduction of the coefficient of friction (%) at different dimple diameters (µm), D20, D40 and D60 compared to an undimpled seal. The different lines represent different rotational speeds. At D20, the reduction is greatest at 50 rpm, then 1000 rpm, then 200 rpm and least at 500 rpm.

FIG. 6 shows the reduction of the coefficient of friction (%) at different dimple diameters (pm), D20, D40 and D60 compared to an undimpled seal, whereby the seals were lubricated with LGMT2 grease. The different lines represent different rotational speeds. The D40 dimples showed the greatest reduction in friction coefficient at all speeds. The effect was also greatest at slow (50 rpm) rotation speeds.

Figure 4A:
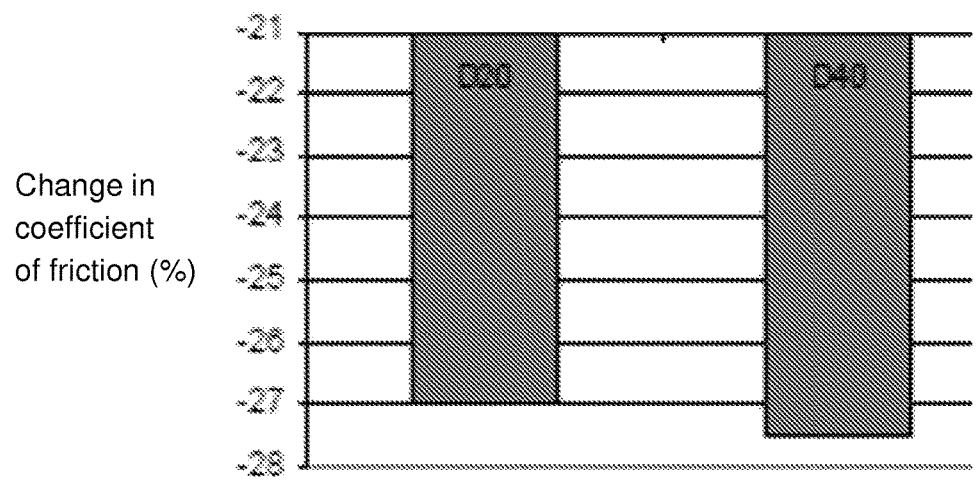
FIGS. 4a and 4b show bar charts for two different circular dimple diameters (D20 and D40) relative to an undimpled seal. Both charts have a y-axis showing the reduction (%) in the coefficient of friction.
Figure 4B:
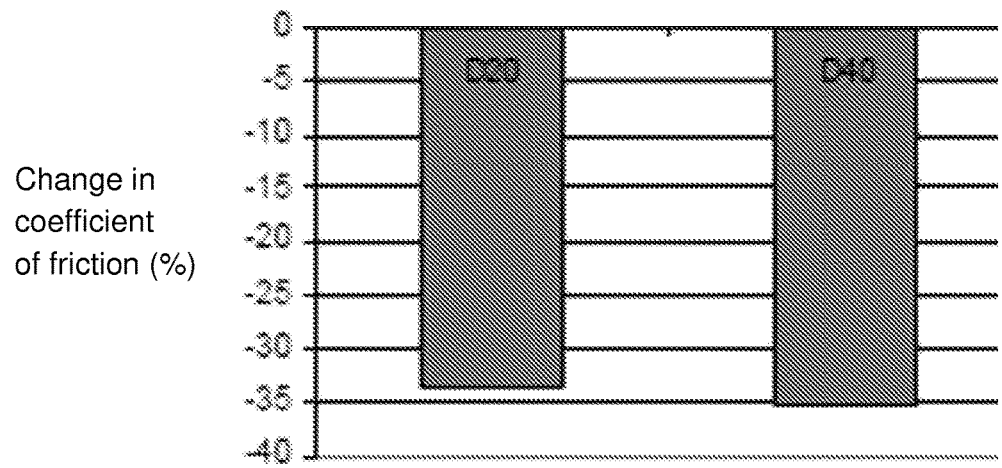

Under LGMT2 grease lubrication, the highest reduction in friction was obtained by D40 and D20 (7 to 16% reduction). FIGS. 4a and 4b show larger reductions (for D40), because a different baseline (undimpled seal) was used.

When introducing elements of the present disclosure or the preferred embodiments(s) thereof, the articles "a", "an", the and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A combination shaft and radial seal comprising:
a shaft having an outer surface which forms a moveable surface during rotation thereof;
a radial seal comprising an elastomeric part having a contact surface in contact with the moveable surface, a garter spring fixed to and directly contacting the elastomeric part of the seal and configured to provide a radial force on the elastomeric part of the radial seal in a direction towards the moveable surface, the contact surface having a distribution of dimples thereon, the dimples being distinct from pillar or bump surface textures such that the dimples do not create a separation between the contact surface and the moveable surface, the dimples having a depth of at least 9 µm, an aspect ratio of at least 0.2 and an area density of from 0.10 to 0.30, wherein the aspect ratio is the ratio of the dimple depth to the dimple diameter and the area density is the extent to which the dimples cover the contact surface of the seal, and wherein each of the distribution of dimples has a volume that is cylindrical such that a first diameter of each of the distribution of dimples taken at the contact surface is the same as a second diameter of each of the distribution of dimples taken at a dimple maximum depth from the contact surface such that the diameter of each of the distribution of dimples is unchanged from the contact surface to the dimple maximum depth from the contact surface such that the distribution of dimples have no effect on pumping properties of the seal.

2. The combination of claim 1, wherein the dimples have a depth of from 9 to 15 µm.

3. The combination of claim 1, wherein the distribution of dimples forms a regular array.

4. The combination of claim 3, wherein the array of dimples covers a majority of the contact surface.

5. The combination of claims 1, wherein the dimples present a substantially circular cross-section at the contact surface.

6. The combination of claim 5, wherein the dimples have a diameter at the contact surface of from 20 to 40 µm.

7. The combination of claim 1, wherein the aspect ratio of the dimples is from 0.25 to 0.5.

8. The combination of claim 1, wherein the area density is from 0.18 to 0.22.

9. The combination of claim 1, wherein the seal is a radial lip seal.

10. A combination shaft and bearing having a radial seal, comprising: a shaft having an outer perimeter forming a moveable surface during use, a radial seal comprising: an elastomeric part including a contact surface in contact with the moveable surface on the shaft, a garter spring fixed to the elastomeric part of the seal and configured to provide a radially inward force on the elastomeric part of the radial seal, the contact surface having a distribution of dimples thereon, the dimples being distinct from pillar or bump surface textures such that the dimples do not create a separation between the contact surface and the moveable surface, the dimples having a depth of at least 9 µm, an aspect ratio of at least 0.2 and an area density of from 0.10 to 0.30, wherein the aspect ratio is the ratio of the dimple depth to the dimple diameter and the area density is the extent to which the dimples cover the contact surface of the seal, and wherein each of the distribution of dimples has a volume that is cylindrical such that a first diameter of each of the distribution of dimples taken at the contact surface is the same as a second diameter of each of the distribution of dimples taken at a dimple maximum depth from the contact surface such that the diameter of each of the distribution of dimples is unchanged from the contact surface to the dimple maximum depth from the contact surface and such that the distribution of dimples have no effect on pumping properties of the seal.

11. The combination of claim 10, further comprising a grease lubricant.

* * * * *